United States Patent [19]

Tsukahara et al.

[11] Patent Number: 4,697,991

[45] Date of Patent: Oct. 6, 1987

[54] ROTARY PUMP HAVING CLUTCH WHICH SELECTS SUITABLE POWER SOURCE

[75] Inventors: Kengi Tsukahara, Oubu; Kazuma Matsui, Toyohashi; Taizoh Abe, Chiryu; Masahiko Suzuki, Hoi, all of Japan

[73] Assignee: Nippondenso Co., Ltd., Kariya, Japan

[21] Appl. No.: 869,860

[22] Filed: May 23, 1986

Related U.S. Application Data

[63] Continuation-in-part of Ser. No. 720,737, Apr. 8, 1985, abandoned.

[30] Foreign Application Priority Data

Apr. 9, 1984 [JP] Japan ................................. 59-71423
May 24, 1984 [JP] Japan ............................... 59-106167

[51] Int. Cl.$^4$ .......................... F04B 1/06; F16D 9/00
[52] U.S. Cl. ................................ 417/219; 192/48.92; 403/2; 417/319; 417/374
[58] Field of Search ............... 192/48.92; 91/497, 498; 418/30, 27; 417/374, 319, 219–221; 403/2

[56] References Cited

U.S. PATENT DOCUMENTS

| | | | |
|---|---|---|---|
| 1,167,509 | 1/1916 | MacDonald | 417/374 |
| 1,502,675 | 7/1924 | Johnston | 403/2 |
| 2,236,484 | 3/1941 | Bergstrom | 192/48.92 X |
| 2,665,638 | 1/1954 | Lauck | 417/319 X |
| 2,683,420 | 7/1954 | Hill et al. | 417/374 X |
| 2,901,975 | 9/1959 | Grad | 91/497 X |
| 2,902,205 | 9/1959 | Parkes | 417/374 X |
| 2,971,402 | 2/1961 | Lovercheck | 192/48.92 X |
| 3,036,528 | 5/1962 | Klopp | 91/472 |
| 3,064,583 | 11/1962 | Bust | 417/222 X |
| 3,086,477 | 4/1963 | Ruhl | 417/219 X |
| 3,187,681 | 6/1965 | Firth et al. | 91/492 X |
| 3,353,493 | 11/1967 | Feroy | 91/497 |
| 3,572,786 | 3/1971 | Dunton | 403/2 |
| 3,642,388 | 2/1972 | Maistrelli | 418/30 |
| 3,750,533 | 8/1973 | Thoma | 91/498 |
| 3,756,749 | 9/1973 | Aldinger | 91/497 X |
| 3,758,899 | 9/1973 | Freeman | 91/497 |
| 3,923,290 | 12/1975 | Tillis | 403/2 X |
| 4,132,506 | 1/1979 | Dantlgraber | 417/218 |
| 4,505,655 | 3/1985 | Honaga et al. | 418/133 |

FOREIGN PATENT DOCUMENTS

576443 10/1977 U.S.S.R. .................................. 403/2

Primary Examiner—Carlton R. Croyle
Assistant Examiner—Theodore W. Olds
Attorney, Agent, or Firm—Cushman, Darby & Cushman

[57] ABSTRACT

As a rotary pump, which is typically provided on an automobile, is provided with two alternative sources of motive power, typically including a driving connection to the automotive engine, and driving connection to an electric motor. These driving connections may be unidirectionally clutched in such a manner as to cause the electric motor to drive the rotary pump only when the pump is to be driven but the automotive engine is not operating up to a predetermined speed. Typically, the rotary pump is of the eccentrically mounted rotor type having radially outwardly protruding spring-loaded pistons effectively in contact with a camming ring. A slider is shown provided between the housing and the ring for effectively varying the magnitude of eccentricity of the rotor and thus for effectively smoothly varying the capacity of the pump.

5 Claims, 13 Drawing Figures

ROTARY PUMP HAVING CLUTCH WHICH SELECTS SUITABLE POWER SOURCE

This is a continuaton-in-part (CIP) of application Ser. No. 720,737, filed Apr. 8, 1985, which was abandoned upon the filing hereof.

FIELD OF THE INVENTION

The present invention relates to a rotary pump which may be used as an oil pump or a fuel pump for automobile, for example.

BACKGROUND OF THE INVENTION

A conventional type of rotary pump used for an automobile is driven by an automotive engine or an electric motor. If the rotary pump is driven by the engine, the pump cannot work before the engine starts. On the other hand, if the rotary pump is driven by an electric motor, that electric motor is required to have enough power to turn the pump and such an electric motor consumes a large quantity of energy, if the electric motor rotates the rotary pump during all of the time the automotive engine is operating.

SUMMARY OF THE INVENTION

An object of the present invention is to provide an automobile with a rotary pump which can work before the automotive engine starts.

Another object of the present invention is to provide a rotary pump which can be driven by a small electric motor, if it is driven by an electric motor. In other words, the rotary pump of the present invention has a purpose to reduce the consumption of electric energy for energizing an electric motor used for powering an automotive rotary pump.

A further purpose of the present invention is to provide a rotary pump which can select the power source thereof. Accordingly, the rotary pump of the present invention has a purpose to be able to be driven by any one of a plurality of power sources such as an automotive engine and an electric motor.

Another purpose of the rotary pump of the present invention is to smoothly vary the volume of the working chamber thereof.

The rotary pump of the present invention, therefore, has a purpose to prevent vibration of the elements of a variable-capacity structure, while a rotor of the pump rotates.

In order to achieve the above-described purposes, the present invention employs a clutch system located between two of the power sources, and a drive shaft which rotates with the pump rotor. The clutch system has a first unidirectional clutch element located between the first power source and the driven shaft, and a second unidirectional clutch element located between the second power source and the driven shaft.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION OF PRESENTLY PREFERRED EMBODIMENTS

Figure 1:
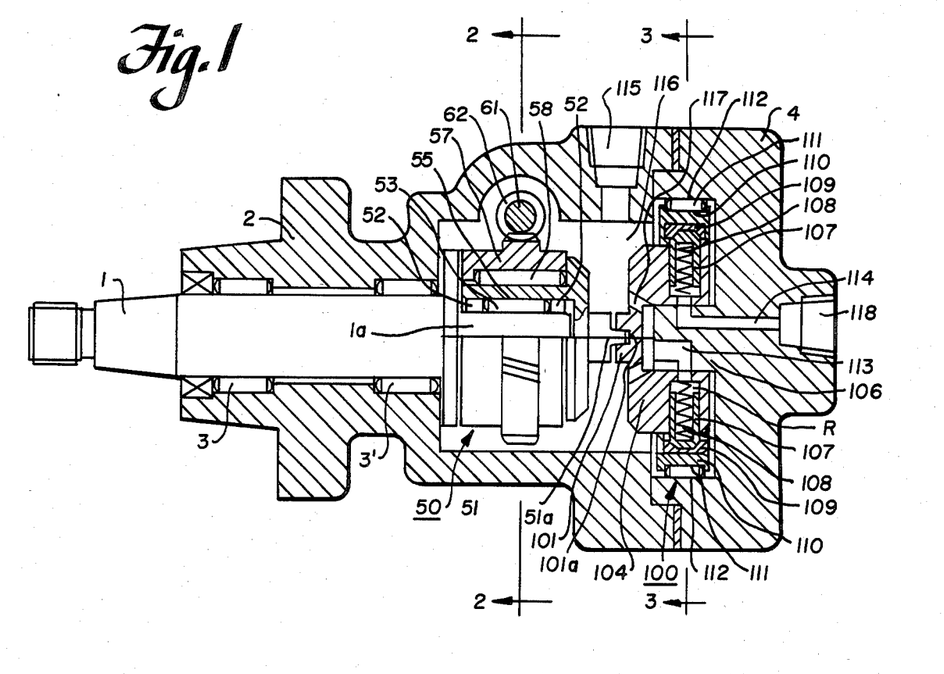
FIG. 1 is a longitudinal cross-sectional view of a first embodiment of the apparatus of the present invention.
Figure 4:
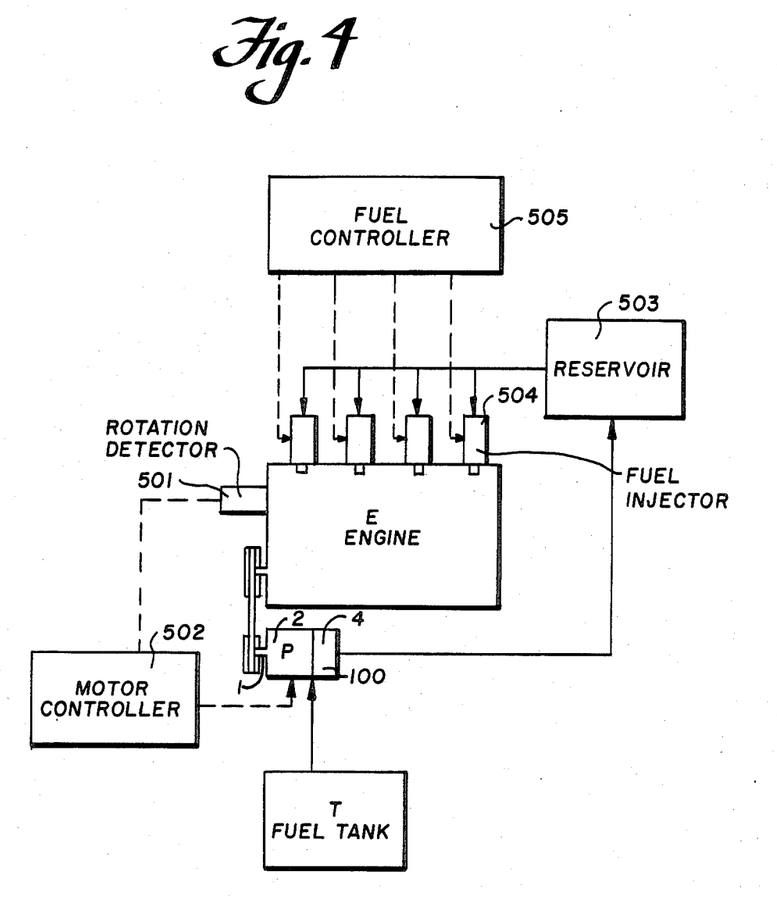
FIG. 4 is a schematic diagram showing an engine controlling system employing the pump shown in FIG. 1.

Numeral 1 in FIG. 1 indicates a rotary shaft rotatably supported in a front housing 2 via bearings 3 and 3'. The rotary shaft 1 is constructed and arranged to be rotated by a first power source, e.g., automotive engine E (FIG. 4). Therefore, the rotary shaft 1 is rotated during the operation of the automotive engine E. The right end (in FIG. 1) of the rotary shaft 1 is shown connected with a clutch system 50. The numeral 51 indicates a driven shaft which is driven by the power source through the clutch system 50 and has a connecting structure 51a provided at the right end (in FIG. 1) thereof. The connecting structure 51a is constructed and arranged to be axially inserted into a notch 101a of a pump shaft 101 of pump portion 100 so that rotation of the driven shaft 51 is transmitted to the pump shaft 101.

Hereinafter, details of the structure of the clutch system 50 are described.

A column portion 1a of the shaft 1, a plurality of side rollers 52, a plurality of center rollers 53, springs 54, and cup 55 and the driven shaft 51 are assembled to provide a first one-way clutch.

Figure 2:
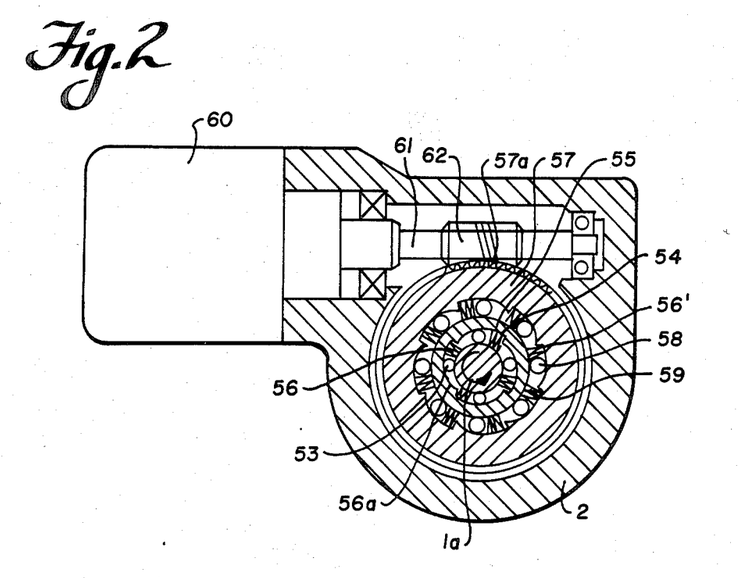
FIG. 2 is a transverse cross-sectional view of a clutch system taken along the line II—II in FIG. 1.

The side rollers 52 and the center rollers 53 are provided on the outer cylindrical surface of the column portion 1a in such order that the longitudinal axis of the side and center rollers 52 and 53 are parallel with that of the column portion 1a. The side rollers 52 are held between the outer surface of the column portion 1a and the inner cylindrical surface of the cup 55 in order to harmonize the center longitudinal axis of the rotary shaft 1 with that of the drive shaft 51. The inner surface of the cup 55 on which the center rollers 52 are held is formed declining grooves 56 as shown in FIG. 2. The springs 54 are provided between the vertical walls 56b of the declining grooves 56 and the center rollers 53 so that the rollers 53 are forced towards declining walls 56a of the declining grooves 56 by the expanding power of the springs 54.

The rotation power of an electric motor 60 which is fixed with the front housing 2, as shown in FIG. 2, is transmitted towards the drive shaft 101 via a second one-way clutch which described as follows:

The rotation of the motor shaft 61 causes a ring 57 to rotate in such manner that a worm gear 62 fixed with the motor shaft 61 engages with gear 57a which is formed on the outer surface of the ring 57. The ring 57, a plurality of outer rollers 58 and springs 59 and the cup 55 are assembled to provide the second one-way clutch. Accordingly, the outer rollers 58 are provided between the other spherical surface of the cup 55 and declining grooves 56' which are formed at the inner surface of the ring 57 and forced toward declining walls 56a' of the declining groove 56' by the expansion force of the springs 59, as shown in FIG. 2.

It is noted that the direction toward which the center rollers 53 are forced is opposite to that of the outer rollers 58, and that the center longitudinal axis of the ring 57 and the cup 55 are harmonized with that of the shaft 1.

Figure 3:
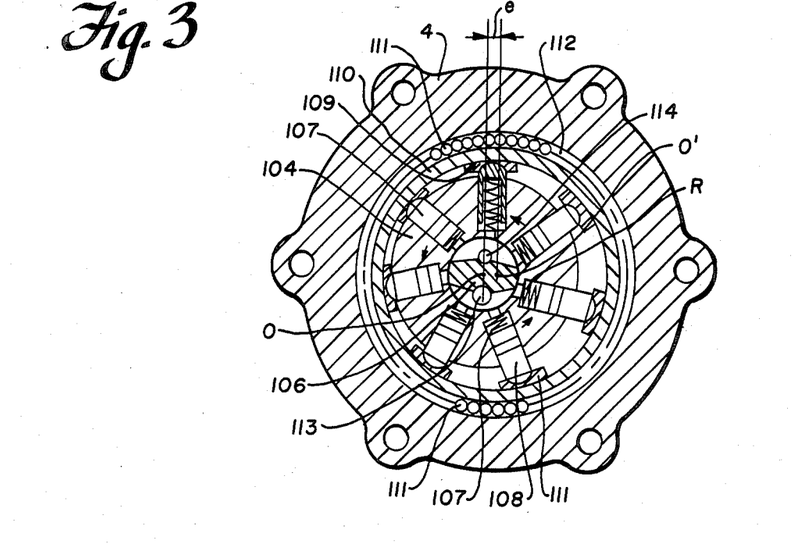
FIG. 3 is a transverse cross-sectional view of pump portion taken along the line III—III in FIG. 1.

The pump portion 100 is explained hereinafter. The pump portion 100 is located inside of a rear housing 4 which is connected with the front housing 2. The rotation of the pump shaft 101 is transmitted to a rotor 104 which is supported by an axially extending center boss 106 so that the rotor 104 can rotate about the axis of the center boss 106. Seven radial cylinders are shown formed in the rotor 104 and even pistons 107 are shown inserted into the respective cylinders in such a manner that each piston 107 can slide along the longitudinal axis of the respective cylinder. Each piston 107 is forced radially outwardly by a respective spring 108, and the head of each piston 107 is attached with the inner-surface of a rolling ring 100 via a shoe 109, as shown in FIG. 3. The rolling ring 100 is supported by a spherical wall 112 formed in the rear housing 4 through a plurality of rollers 111 so that the rolling ring can rotate along with the cylindrical wall 112. The center 0 of the cylindrical boss 106 and the center 0' of the cylindrical wall 112 are eccentric. Therefore, the piston 107 transversally reciprocates in the cylinder formed in the rotor 104 when the rotor 104 rotates. The movement distance of the piston 107 is twice as long as the distance between the axis 0 and 0'. Accordingly, a working chamber M which is defined within the cylinder and the piston 107 is changed into volume during rotation of the rotor 104. Namely, when the rotor 104 rotates counterclockwise, in FIG. 3, upper half pistons 107 move outwardly, but lower half pistons 107 move inwardly, so that the working fluid such as fuel is introduced into the working chamber M through a suction port 113 which is formed in the boss 106, then the working fluid is discharged towards a discharge port 114. The fluid is forced through a suction connecting port 115 formed in the front housing 2, an inner space 116 of the front housing 2, a connecting path 117 formed in the rotor 104, then introduced into the suction port 113. The fluid introduced into the working chamber M is pressed when the working chamber M reduces the volume thereof. Then the pressed fluid is discharged toward a discharge connecting port 118 via the discharge port 114.

The operation of the pump is described as follows:

First, the operation of the clutch system 50 is explained. When the shaft 1 rotates counterclockwise in FIG. 2, faster than the rotation of the cup 55, the center rollers 53 move towards the declining wall 56a so that the center rollers 53 are tightly held between the declining wall 56a and the outer surface of the column 1a. Accordingly, the cup 55 is rotated with the same speed as the shaft 1.

On the other hand, when the rotational speed of the shaft is smaller than that of the cup 55, the center rollers 53 move toward the vertical wall 56b, so that the center rollers 53 are freely held in the enlarged portions of the groove 56. Therefore, the rotation of the cup 55 does not influence the rotation of the shaft 1. Namely, the rotation of the cup 55 does not cause the shaft to rotate, albeit the rotation of the shaft 1 causes the cup 55 to rotate.

When the electric motor 60 is energized, the rotation of the motor shaft 61 is transmitted to the ring 57 through the worm gear 62 and the gear 57a. Then the ring 57 rotates counter-clockwise in FIG. 2. When the ring 57 rotates faster than the cup 55, the outer rollers 58 move towards the declining wall 56a', so that the outer rollers 58 are tightly held between the declining wall 56a' and the outer surface of the cup 55. Therefore, the rotation of the ring 57 is transmitted to the cup 55. On the other hand, when the cup 55 rotates faster than the ring 57, the outer rollers 58 move toward the vertical wall 56b' so that the outer rollers 58 are freely held in the enlarged portion of the groove 56'. Therefore, the rotations of the ring 57 and the cup 55 do not transmit each other.

As described above, the clutch system 50 can transmit one of the rotations of the shaft 1 and the ring 57 to the cup 55. In other words the shaft 1 and the ring 57 do not influence each other. Therefore, the clutch system 50 can select the faster rotating power from two different power sources, e.g., the automotive engine E and the electric motor 60. Then the clutch system transmits the rotation of the cup 55 to the driven shaft 51 so that rotary power is transmitted to the pump shaft 101.

After receiving the rotary power, the rotor 104 and the outer ring 110 rotate inside of the rear housing 4, and the pistons 108 are reciprocated within the cylinders in order to pump the fuel. Therefore, the fuel for the automotive engine E is suctioned to the pump portion 100 from a fuel tank T, as shown in FIG. 4. Then the fuel is discharged to a reservoir 503 through the discharge connecting port 118.

The numeral 501 in FIG. 4 indicates a rotation detector which detects the voltage generated by an alternator, which is driven by the engine E, in order to calculate the rotational speed of the engine E. Numeral 502 designates a controller for the electric motor 60. The controller 502 outputs a control signal to start motor 60 when the key-switch of the engine E turns ON. In other words, the control signal to cause the motor 60 energize is output prior to the starting of the engine E. When the detecting signal from the detector 501 shows that the rotation speed of the engine E is increased to the predetermined speed, the controller 502 outputs the control signal to stop the motor 60. Therefore, the motor 60 does not have to work continuously.

Numeral 504 designates a fuel injector which receives the fuel from the reservoir 503 then injects the fuel into a cylinder of the engine E. The injection period and timing of the fuel injector 504 is controlled by a fuel controller 505. The fuel controller 505 computes the injection period and timing in accordance with the load and rotation speed of the engine E. As described above, since the pump portion 100 an be rotated by the motor 60 prior to the starting of the engine E, the fuel pressure in the reserver 503 can become high enough when the engine E starts. Therefore, the needed period for starting the engine E can be substantially shortened.

Furthermore, since the rotational power of the engine E is transmitted to the pump portion 100 automatically when the rotation speed of the shaft 1 becomes faster than that of the ring 57, the rotation power of the engine E can be used instead of that of the motor 60 after the rotational speed of the engine becomes as great as a predetermined speed. In other words, the motor 60 stops its operation after the load thereof is reduced.

Since the motor 60 does not have to work continually, the motor 60 for the present embodiment can be much smaller than the electric motor heretofore conventionally used. For example, a conventional motor which works continually during the operation of the pump portion 100 would weigh several kg when the pump 100 discharges the fuel at 400$^{cc}$/min, 200$^{kg}$/cm$^2$. However, the motor 60 for the present embodiment can reduce the weight thereof down to several hundreds of grams and yet the pump 100 can discharge the fuel at 400$^{cc}$/min, 200$^{kg}$/cm$^2$.

Though the motor controller 502 of above described embodiment outputs the stopping signal of the motor in accordance with the rotation speed of the engine E, the motor controller can use the pressure signal of the fuel in the reservoir 503 instead of the rotational speed signal of the engine E. Namely, after the fuel pressure in the reservoir 503 becomes sufficiently high, the motor controller 502 outputs the stopping signal of the motor 60.

Figure 5:
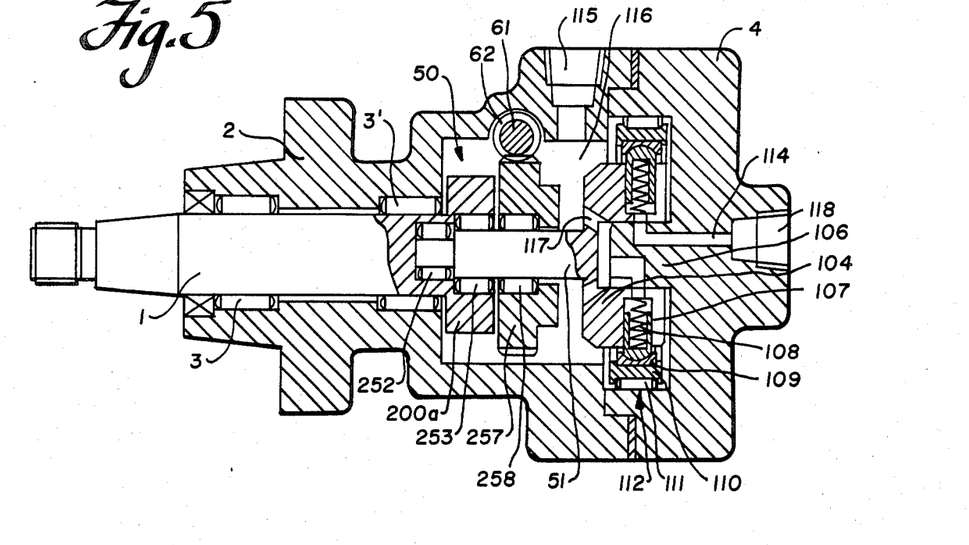
FIG. 5 is a longitudinal cross-sectional view similar to FIG. 1, of a second embodiment of the apparatus of the present invention.

FIG. 5 shows a second embodiment of the apparatus of the present invention. The first and second one-way clutches of this second embodiment are provided in parallel along the longitudinal axis of the driven shaft 51.

Accordingly, a disc-connecting portion 200a formed at the right end of the shaft 1 works in the same manner as the column portion 1a of the first embodiment, and a ring 257 also works in the same manner as the ring 57 of the first embodiment. Numerals 252, 253 and 258 designate first, second and third rollers which work in the same manner as the side, center and outer rollers 52, 53 and 58 of the first embodiment, respectively.

Figure 6:
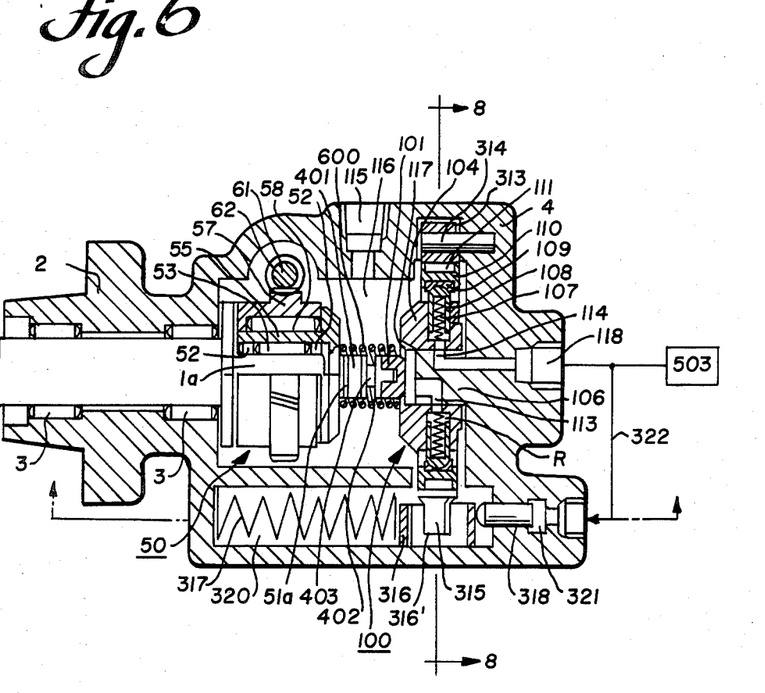
FIG. 6 is a longitudinal cross-sectional view of a third embodiment of the apparatus of the present invention.
Figure 7:
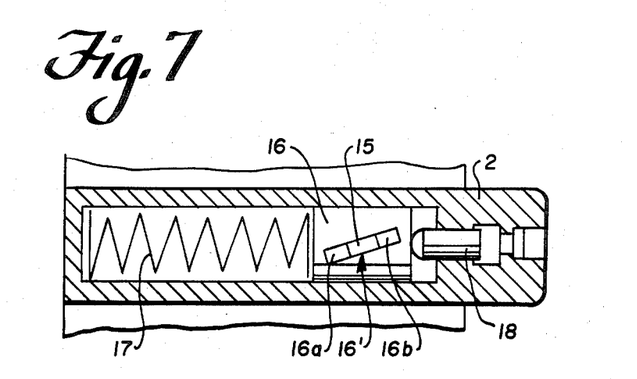
FIG. 7 is a fragmentary longitudinal cross-sectional view showing a slider, taken along the line VII—VII in FIG. 6.
Figure 8:
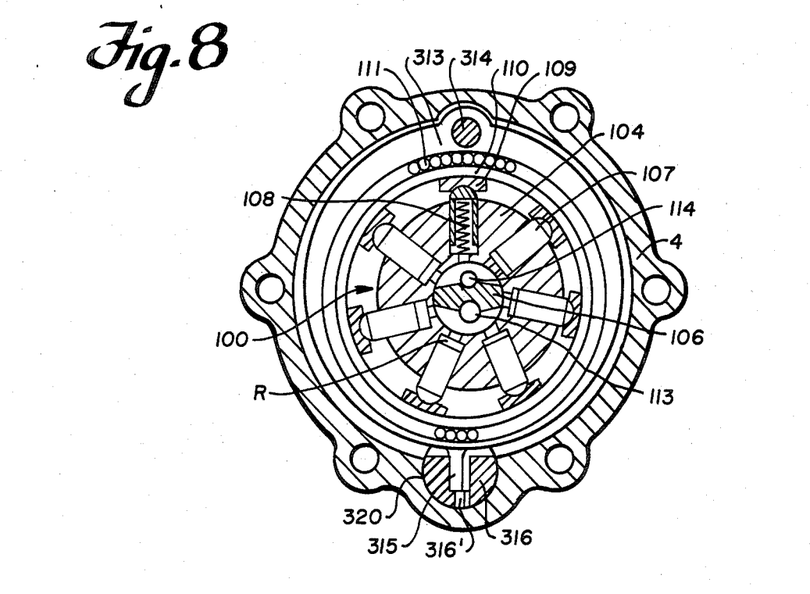
FIG. 8 is a transverse cross-sectional view of a pump portion taken along the line VIII—VIII in FIG. 6.

FIGS. 6, 7 and 8 show a third embodiment of the apparatus of the present invention. The third embodiment employs a variable-capacity function of the pump portion 100.

Accordingly, the outer cylindrical surface of the outer ring 110 is held within the inner cylindrical surface of an eccentric ring 113 through a plurality of rollers 312 in such a manner that the outer ring can freely rotate in the eccentric ring 313. The upper portion of the eccentric ring 313 is supported by a pin 314 which is fixed with the rear housing 4 so that the eccentric ring 313 can oscillate within the rear housing 4. The lower portion of the eccentric ring 13 has a convex plate 315 which connects with a slit 316' formed in a slider 316. The slider 316 is held in a control groove 320 formed in the housing 4 in such a manner that the slider 316 can slide along the longitudinal axis of the groove 320 which is parallel with that of the pump shaft 101. The slit 316' and the plate 315 are slightly declined with the sliding direction of the slider 316.

The slider 316 is forced toward right side in FIG. 6 by the expanding force of a spring 317, and contacted with a control piston 318. The control piston 318 is held in a control cylinder and slid along with the longitudinal axis of the cylinder which is the same line of that of the control groove 320. Numeral 321 designates a pressure chamber formed at the right end portion of the piston 318. The discharged fuel is introduced into the pressure chamber 321 through pressure passage 322. The pressure of the fuel in the pressure chamber 321 forces the piston 318 toward left side so that the piston 318 and the slider 316 move to the left side.

In accordance with the movement of the slider 316, the eccentric ring 313 and the outer ring 11 swing in the rear housing 4, because the slit 316' and the plate 315 are declined as shown in FIG. 7. Therefore, the distance E between the axis 0 and 0' of the rotor 104 and the outer ring 110 is changed according to the movement of the slider 316.

When the pump portion 100 begins to operate the pressure of the fuel in the pressure chamber 321 is rather low. Therefore, the slider 316 is forced to move to its right end position in FIG. 6 by the expanding power of the spring 317, and the plate 315 locates at the left end position in the slit 316' of the slider 316. Accordingly, the eccentric ring 313 swings counter-clockwise in FIG. 8 to make the distance E maximum so that the capacity of the pump portion 100 becomes maximum.

After the pump portion 100 operates, the pressure of the fuel in the pressure chamber 321 increases so that the piston 318 forces the slider 316 toward left side in FIG. 6 against the expanding force of the spring 317. Since the slit 316' is declined and since both sides of the plate 315 contact with the both sides of the inner wall of the slit 316', the eccentric ring 313 swings according to the movement of the slider 316 so that the distance E is reduced. Accordingly, when the amount of fuel discharged from the pump 100 exceeds the needed amount. Therefore, when the pressure of fuel in the chamber 321 increases, the pump 100 reduces the discharge capacity thereof so that the amount of fuel discharged corresponds with the needed amount.

Since the eccentric ring 313 of this embodiment is supported both at upper and lower ends, the mechanical rigidity of the eccentric ring 313 is sufficient. Furthermore, since both said surfaces of the plate 315 are contacted with the inner surface of the slit 316', since the slider 316 is held in the groove 320, and since the direction of the longitudinal axis of the groove 320 falls at right angles with the rotating direction of the rotor 104, vibration of the eccentric ring 313 while the rotor 104 rotates within the eccentric ring 313 is presented. Namely, since the spring 317 and the piston 318 do not receive the vibration of the rotor 104 and the outer ring 110 caused by the fluctuation of the pressure in the working chamber R, the eccentric ring 313 can hold its position effectively and also the eccentric ring 313 can be swung smoothly.

Figure 9:
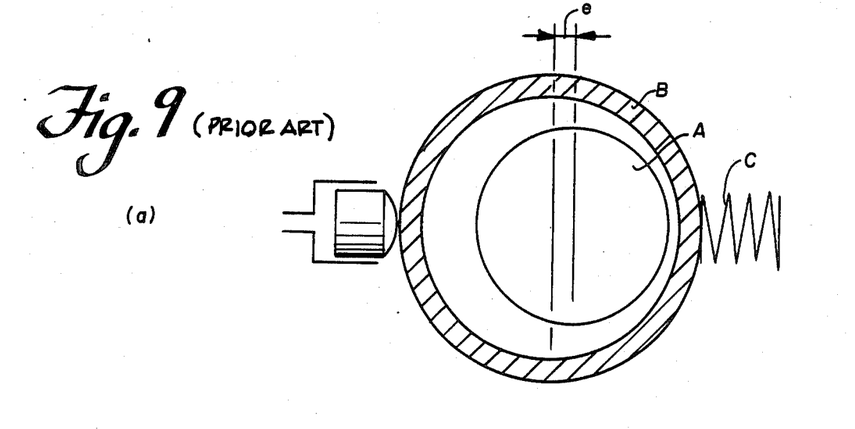
FIGS. 9, 10 and 11 are schematic views showing conventional structure for varying the capacity of the pump portion.
Figure 10:
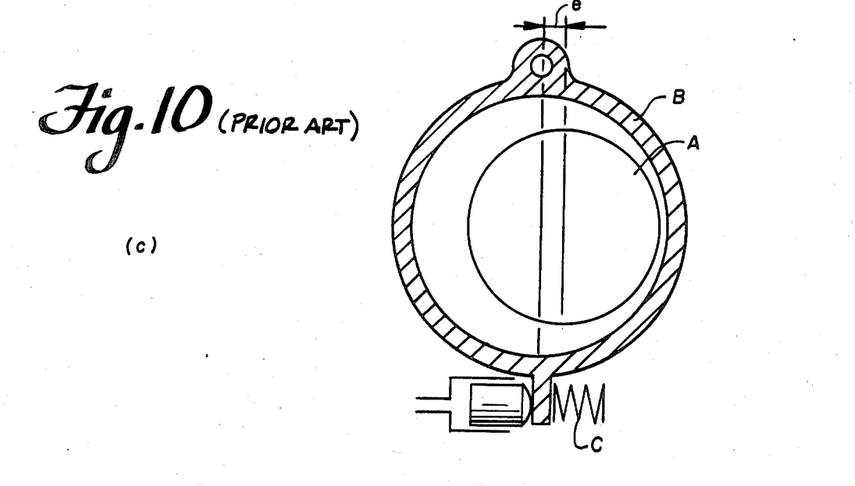
Figure 11:
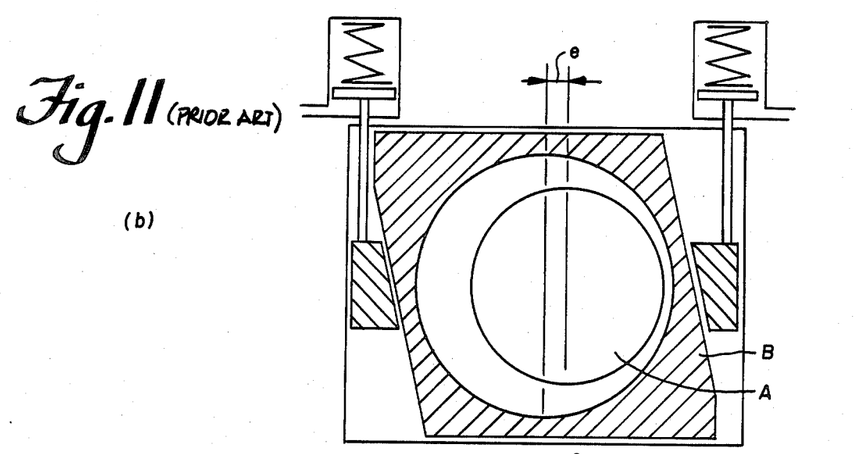

FIGS. 9, 10 and 11 show another basic concept for moving an eccentric ring B. However, since the eccentric rings B of FIGS. 9 and 10 are directly supported by the spring C, the vibration of the eccentric ring B cannot be prevented. Since the eccentric rings B of FIG. 11 are slid within the housing, a large friction is caused when the eccentric ring B moves. Therefore, control of the sliding amount of the eccentric ring B is difficult.

Figure 12:
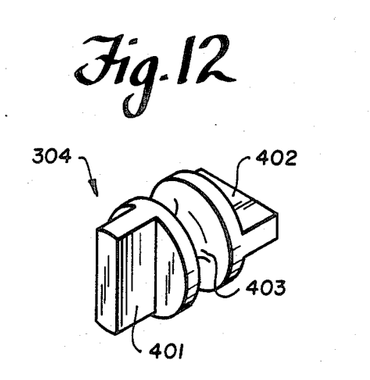
FIG. 12 is a perspective view of a joint used for the third embodiment.
Figure 13:
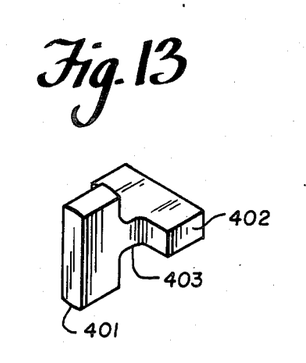
FIG. 13 is a perspective view showing another variation of the joint.

The third embodiment employs an especially designed joint 304 as shown in FIG. 12. Namely, the joint 304 is constituted from a first plate 401 which is inserted in a connecting notch formed in the right end of the driven shaft 51, a second plate 402 which is inserted in the connecting notch 101a of the pump shaft 101 and a central narrower portion 403 located between the first and second plates 401 and 402. This joint 304 is used for connecting the driven shaft 51 and the pump shaft 101 albeit the longitudinal axis thereof are slightly different from each other. Furthermore, the joint 304 is also used in order to protect the clutch portion 50 and the pump portion 100. Since the central narrower portion 403 is the weakest point along the driven shaft 51, the joint 304 and the pump shaft 101, the center narrower portion 403 is broken first when the pump portion 100 cannot rotate smoothly such as due to the undesired welding of the piston 107 against the cylinder. The joint 304 is much cheaper than the other elements of the clutch 50 and the pump 100, and it is easily to exchange the joint 304. FIG. 13 shows another design for the joint 304.

Through the pump portion 100 of the above described embodiments is shown being a radial, rotary piston-type pump, other types of pump, for example a vane-type pump, can be used for the present invention.

Referring again to FIG. 6, a coil spring 600 is shown inserted between the rotor and the driven shaft in such a manner that the joint 304 is embraced within the spring 600. The main function of the spring 600 is to force the rotor rightwards, so that the rotor position is adjusted and vibration of the rotor in the longitudinal direction is prevented. The spring 600 is so wound and mounted that the spring 600 will not become loose even when the joint 304 is broken so that the driven shaft on which one end of the spring 600 is mounted rotates but the rotor on which the other end of the spring is mounted does not rotate. The spring 600 provides the advantage that it forces the rotor 104 towards the housing when the joint is broken, thereby preventing the rotor from losing its position even when the joint is broken.

What is claimed is:

1. A rotary pump, comprising:
   a housing,
   a clutch system provided in said housing, and including:
     a driven shaft, and
     a clutch means constructed and arranged for transmitting rotational power of a rotary power source to said driven shaft, and
   a pump portion provided in said housing and including:
     a rotor means connected with said driven shaft and being constructed and arranged for rotating simultaneously with a rotation of said driven shaft,
     a cylinder formed in said rotor,
     a piston slidably provided in said cylinder and having a top portion thereof protruding from said cylinder,
     a cylindrical guid ring rotably provided between said top portion of said piston and said housing, said guide ring having a longitudinal axis which is eccentric relative to that of said rotor,
     a working chamber being formed between said cylinder and a bottom portion of said piston and the effective volume of which is arranged to be varied in accordance with the rotation of said rotor means,
     fluid inlet and outlet port means provided to and from said working chamber so that a working fluid pumped as said rotor means rotates,
     an eccentric ring provided between said housing and said guide ring, one part of said eccentric ring being pivotally connected with said housing and an opposite part from said one part being held by a slider in such a manner that said eccentric ring is swung in accordance with movement of said slider so that the eccentric distance between said longitudinal axis of said guide ring and that of said rotor is controlled by movement of said slider, and
     said slider being slidably held in a control groove provided in said housing in such manner that said slider slidably reciprocates within said control groove, said control groove having a longitudinal axis that is arranged to be perpendicular to the rotating direction of said rotor, and said longitudinal axis of said control groove being arranged to be parallel with a longitudinal axis of said driven shaft.

2. A rotary pump according to claim 1, wherein:
   said driven shaft has a transmitting portion at an end thereof, and
   said pump shaft has a transmitting portion at an end thereof, and further comprising:
   a joint having a couple of transmitting portions at both ends thereof, one of said transmitting portions being detachably connected with said transmitting portion of said driven shaft in such manner that said joint can slighly slide with said driven shaft while said joint rotates simultaneously with a rotation of said driven shaft, another one of said transmitting portions being detachably connected with said transmitting portion of said pump shaft in such manner that said joint can slightly slide with said pump shaft while said joint rotates simultaneously with a rotation of said pump shaft, so that said joint is detachably provided nbetween said driven shaft and said pump shaft for transmitting a rotation power from said driven shaft to said rotor, said joint being constructed as different element from said driven shaft and said pump shaft and being constructed and arranged to have a weak portion the mechanical strength of which is weaker than that of said driven shaft and than that of said pump shaft.

3. A rotary pump according to claim 1, further comprising:
   a joint having a couple of transmitting portions at both ends thereof, one end of said joint being detachably connected with said driven shaft another end of said joint beingd etachably connected with said rotor means so that said joint is detachably provided between said driven shaft and said rotor means for transmitting a rotation power from said driven shaft to said rotor means, said joint being constructed as different element from said driven shaft and said rotor means and being constructed and arranged to have a weak portion the mechanical strength of which is weaker than that of said driven shaft and than that of said rotor means; and
   a spring provided between said clutch means and said rotor means for forcing said rotor means toward said housing.

4. A rotary pump claimed in claim 3, wherein:
   said spring is a coil spring having a winding direction which is opposite to the direction of rotation of said driven shaft.

5. A rotary pump, comprising:
   a housing,
   a clutch system provided in said housing, and including:
     a driven shaft having a direction of rotation, and a clutch means constructed and arranged for transmitting rotational power of a rotary power source to said driven shaft, a pump shaft, a rotor means connected with said pump shaft and being constructed and arranged for rotating simultaneously with a rotation of said pump shaft, a housing on which said rotor means is rotatably mounted, a working chamber the effective volume of which is arranged to be varied in accordance with the rotation of said rotor means, fluid inlet and outlet port means provided to and from said working chamber so that a working fluid is pumped as said rotor means rotates, a joint having a couple of transmitting portions at both ends thereof, one end of said joint being detachably connected with said driven shaft another end of said joint being detachably connected with said pump shaft so that said joint is detachably provided between said driven shaft and said pump shaft for transmitting a rotation power from said driven shaft to said rotor, said joint being constructed as different element from said driven shaft and said pump shaft and being constructed and arranged to have a weak portion the mechanical strength of which is weaker than that of said driven shaft and than that of said pump shaft;

a spring provided between said clutch means and said rotor means for forcing said rotor means toward said housing;

said spring being a coil spring having a winding direction which is opposite to the direction of rotation of said driven shaft;

said coil spring being provided around said joint in such a manner that said coil spring embraces said joint.

* * * * *